Feb. 11, 1936.  J. M. RICHARDS  2,030,718
SKYLIGHT OR FLOORLIGHT CONSTRUCTION
Filed Dec. 30, 1933  2 Sheets-Sheet 1
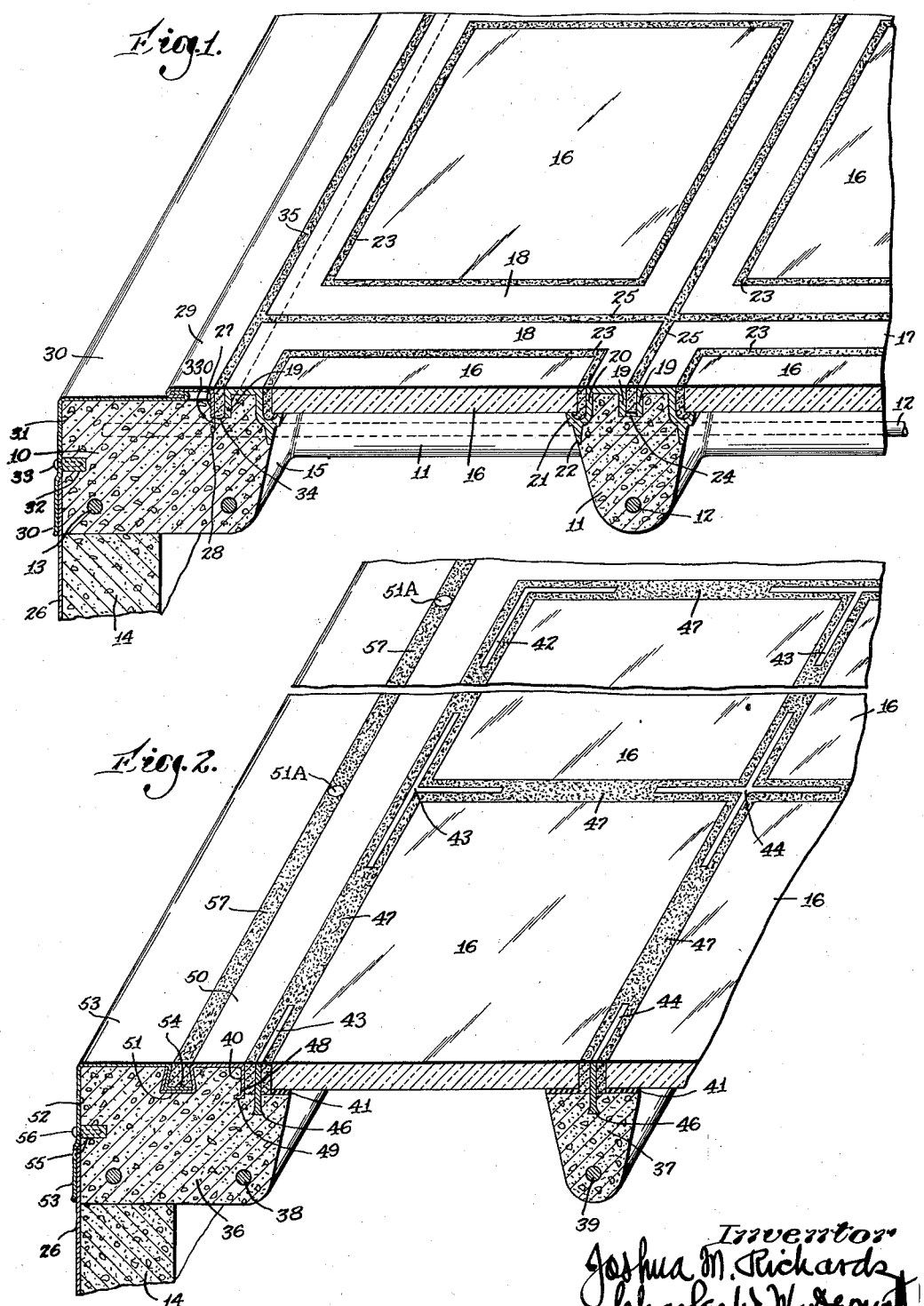
Inventor
Joshua M. Richards
by Charles W. Wedemeier
his attorney Feb. 11, 1936.   J. M. RICHARDS   2,030,718
SKYLIGHT OR FLOORLIGHT CONSTRUCTION
Filed Dec. 30, 1933   2 Sheets-Sheet 2

Inventor
Joshua M. Richards
by Charles W. McDermott
his Attorney

Patented Feb. 11, 1936

2,030,718

UNITED STATES PATENT OFFICE 2,030,718

SKYLIGHT OR FLOORLIGHT CONSTRUCTION

Joshua M. Richards, Brookline, Mass.

Application December 30, 1933, Serial No. 704,620

29 Claims. (Cl. 94—28)

The present invention relates to glass and concrete skylight and floorlight constructions.

In the installation of such constructions it has heretofore been the practice to embed panes of glass directly in the concrete or to embed in the concrete one or more shields which receive and protect the glass. In either case the concrete surface between the panes of glass and outside the glass area has been left entirely exposed and thus subject to weathering which causes the concrete to crack and leak and/or results in a disturbance of the bond between the glass and the concrete. Small fissures in the concrete appearing as the result of weather conditions are difficult to seal permanently, and the same is true of when a pane has become loose. To insure the greatest permanence to these types of construction, it has been necessary to have ideal working conditions and to employ workmen skilled in the art of installing glass and concrete in a watertight manner.

The principal object of the present invention is to provide a glass and concrete skylight or floorlight construction which has no concrete exposed to be affected by weather conditions.

It is a further object of the present invention to provide a glass and concrete skylight or floorlight construction which does not depend wholly upon the concrete itself to insure that the construction is thoroughly watertight.

It is a further object of the present invention to provide a glass and concrete skylight or floorlight construction which does not require ideal working conditions and skilled workmen to make it.

To the accomplishment of these objects and such others as may appear hereinafter, the various features of the present invention reside in certain devices, combinations and arrangements of parts hereinafter described and then set forth broadly and in detail in the appended claims which possess advantages readily apparent to those skilled in the art.

The various features of the present invention will be readily understood from an inspection of the accompanying drawings illustrating the best forms of the invention at present known to the inventor, in which, Figure 1 is a detail view in perspective, partially in section, showing one form of the present invention;

Fig. 2 is a detail view in perspective, partially in section, showing a different form of the present invention;

Figure 3:
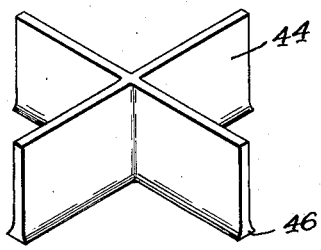
Fig. 3 is a view in perspective of a cross-shaped shield member.
Figure 4:
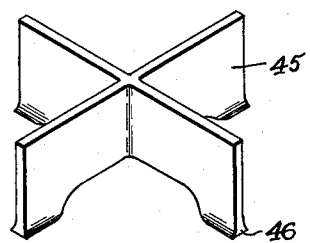
Fig. 4 is a view in perspective of a modified cross-shaped shield member.
Figure 5:
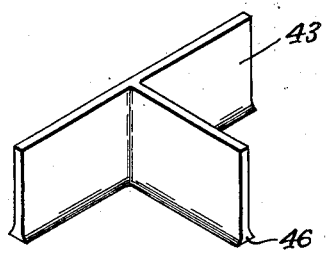
Fig. 5 is a view in perspective of a T-shaped shield member.
Figure 6:
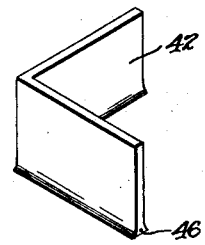
Fig. 6 is a view in perspective of a V-shaped shield member.

The embodiment of the present invention illustrated in Fig. 1 comprises a unitary reinforced concrete grid framework provided with a peripheral border portion 10 which surrounds an apertured portion or area made up of spaced grid members 11 integral with the border and extending transversely and longitudinally thereof so as to form a plurality of openings. Only one run of the border 10 is illustrated in the drawings because the other runs are of the same construction. For strength, the grid members 11 are provided with reinforcing bars or rods 12 the opposite ends of which terminate within the body of the border 10. Each run of the border is also provided with reinforcing bars or rods 13, and as indicated in the drawings, the border 10 is adapted to rest on a roof curbing 14. The general features of this unitary reinforced concrete construction are old and well known.

The grid construction shown in Fig. 1 is adapted to support a plurality of square or rectangular light transmitting panes 16 which may be made of either plain or wired glass. To this end the panes 16 are received by correspondingly shaped protecting shields 17, preferably of non-rusting or galvanized metal, which surround the pane edges and are anchored in the concrete about the openings formed by the spaced grid members. The four sides of the shields 17 are each channel-shaped, comprising at the top a web 18 from which depend an outer wing 19 and an inner wing 20. Each outer wing 19 extends downward a distance about equal to the thickness of the panes 16 used, and each inner wing 20 is provided throughout its length with a laterally extending lug 21 and also with a depending lug 22. The lugs 21 form a support for the pane 16, holding it out of contact with the cement, and are so positioned relatively to the inner wings 20 that the upper surface of the pane is flush with the top of the webs 18, as indicated.

Each pane 16 is bound within its shield 17 by means of a waterproof and slightly elastic compound 23, such as a combination of tar and sulphur, which terminates flush with the top surface of the pane 16 and the webs 18. The compound 23, in addition to holding the panes in place, also serves as an expansion joint which relieves the panes of all compression strains resulting from temperature changes, superimposed weight, or expansion of the concrete itself.

As a matter of construction, the inverted channels formed by the webs and wings of the shields 17 are filled with concrete and are integrally bonded to the concrete grid as it is formed. As shown in Fig. 1, when the shields are embedded in the concrete about the openings formed by the grid members 11, the outer wings 19 of adjacent shields do not meet but are slightly spaced apart, leaving between them a narrow groove 24. The bottom of this groove is concrete and is on a level slightly above the bottom edges of the wings 19, thereby serving to anchor these wings firmly in place. It will be seen that this construction results in the formation of a plurality of narrow grooves running transversely and longitudinally of the border 10 between adjacent rows of shields 17. These grooves are filled, flush with the top of the webs 18, with a waterproof and slightly elastic compound 25, which may also be a combination of tar and sulphur, to cover the concrete between the shields 17 and to form an expansion joint functioning like that formed by the compound 23 between the panes and shields.

There has been described so far the construction of the lighting area of one embodiment of the present invention. It will be seen that the apertured portion of the concrete itself is completely covered by the panes 16, the shields 17, the compound 23, and the compound 25 between the rows of shields. The upper surface of the covering thus made is substantially planiform. Stated in another way, the apertured or shield area of the construction is completely covered with materials that are waterproof and/or slightly elastic so that the underlying concrete is fully protected from the effects of the weather.

For giving a weather protection to the exposed surfaces of the border 10, the present invention, when used for skylight purposes, contemplates the use of a sheathing which covers the border 10 and overlaps a flashing 26 associated with the curbing 14 on which the border rests.

Viewing Fig. 1 it will be seen that the top surface of the border 10 terminates inwardly in an edge that is slightly spaced from the outer wings 19 of the shields lying adjacent the border, so that a vertical wall 27 is formed spaced from the wings. A continuous metallic strip 28, anchored in the body portion of the border 10, rises in engagement with the wall 27 and is bent outwardly at right angles at a point in the plane of the webs 18 to form a flat strip surface 29 covering a portion of the top surface of the border 10. The free edge portion of the strip surface 29 is bent downwardly and backwardly to form a channel which receives the correspondingly bent edge portion of a sheet 30 of copper or other roofing material which covers the remainder of the top of the border 10 and also the side wall 31 thereof and overlaps the flashing 26 which engages the curbing 14. The side wall 31 of the border 10 may be provided with a strip of wood 32 or with lead plugs during the pouring of the concrete, and to this strip of wood or to the lead plugs the sheet 30 may be secured by a row of tacks, one of which is shown at 33 in Fig. 1.

The metallic strip 28 may be anchored at the base of the wall 27 merely by insertion in the concrete before it sets. It is preferred, however, to provide the strip 28 with a series of apertures 330 so that the concrete, before setting, passes through the apertures as well as around the strip, thereby providing a firmer anchorage and also eliminating any tendency of a cleavage of the concrete in the plane of the strip.

It will be seen that the above construction results in the formation of a narrow cement-bottomed groove 34 between the strip 28 and the outer wings 19 of the shields 17 adjacent the border 10. The purpose of this groove is to provide for an expansion joint between the border 10 and the adjacent shields, and to this end the groove 34 is filled to the level of the top of the webs 18 and the flat strip surface 29 with a waterproof and slightly elastic compound 35 which may be the same as the compounds 23 and 25.

Each of the runs of the border 10 is constructed in a manner like that of the run illustrated, and each is provided with stripping and sheathing like the strip 28 and the metallic sheet 30. With this construction the exposed surfaces of the entire border 10 are covered by a metallic sheathing, and the groove 34 formed between the runs of the border 10 and the shield area is filled with the compound 35. Stated in another way, the external surfaces of both the apertured portion or shield area and the border portion of the concrete unit are completely covered and protected from the effects of the weather by a watertight covering.

The construction so far disclosed is best adapted for skylight use since the plane of the shield area and the strip surface 29 is on a level slightly higher than that of the portion of the metallic sheet 30 covering the top of the border 10. Since a floorlight construction should lie wholly in the plane of the flooring in which it is used, a construction is shown in Fig. 2 which may be used to achieve this result, although the Fig. 2 construction is shown as used for skylight purposes so as to make a complete disclosure.

The general nature of this Fig. 2 construction, as far as the concrete is concerned, is similar to that shown in Fig. 1. That is, it comprises a reinforced concrete grid provided with a peripheral border portion 36 and spaced grid members 37 integrally joined to the border 36 as are the grid members 11 to the border 10. Bars or rods 38 and 39 reinforce the border 36 and the grid members 37, respectively. The grid members 37 need not be as wide as the grid members 11 (Fig. 1) since the shields for the panes 16 are differently constructed, as will be described hereinafter.

It will be noticed that the upper surface of the apertured portion of the concrete of this construction lies in a plane and that this plane is lower than that of the top of the border 36 so as to form a shoulder providing the border with an inner vertical wall 40. It will also be noticed that the pane openings are somewhat smaller than the panes 16 so that the concrete forming the edges of the openings lies under the edges of the panes to form a support for them. Interposed between the edges of the panes 16 and the concrete beneath them is insulating material 41 which protects the pane from any damage it might receive if engaged directly with the concrete.

The panes shown in Fig. 2 are not surrounded by one-piece shields such as the shields 17, but are set within galvanized or non-rusting metallic shields each of which comprises several members spaced from each other and, depending upon the location of the pane with respect to the border 36, comprising one, two, or three different types. These types are illustrated in Figs. 3, 4, 5 and 6. The shield member 42 (Fig. 6) is in the shape of a V; the shield member 43 (Fig. 5) is in the shape of a T; and the shield member 44 (Fig. 3) is in the shape of a cross. The angle between adjacent wings of each type of these shield members is 90°, as indicated, so that the shield members are adapted to conform to the corners of the panes 16 when in position. The shield member 45 (Fig. 4) shows a modified cross construction, the bottom portion of which is partially cut away. As will be shown hereinafter, the multi-piece shields (Fig. 2) formed by the spaced shield members 42, 43, and 44 or 45, are the full equivalent of the one-piece shields 17 shown in Fig. 1.

These shield members 42, 43, 44 and 45 are about twice the thickness of the pane 16 used, and are embedded in the concrete to a depth such that their tops lie in the plane of the upper surface of the panes 16 when in position on the insulating material 41, as shown in Fig. 2. For a more secure anchorage in the concrete, the lower portions of the walls of the wings of each type of shield flare slightly as indicated at 46.

The V-shaped shield member 42 is adapted to be embedded in the concrete at the corners formed by adjacent runs of the border 36 and is spaced from the wall 40 thereof. The T-shaped shield member 43 is adapted to be embedded in the concrete of both the border run 36 and of a grid member 37 extending therefrom, with the top of the T being parallel with the border run and spaced from the wall 40. The cross-shaped shield members 44 and 45 are adapted to be embedded in the concrete of only the grid members 37 and are thus located only within the pane area between the corners of four adjacent panes, and not along the edges of the pane area.

When in position the shield members are spaced apart as indicated in Fig. 2 and comprise a series of shields about the openings formed by the grid members 37. These shields serve the same function as the one-piece shields 17 inasmuch as they serve to protect and locate properly the corners of the panes 16 in a manner similar to that of the corners of the shields 17, and this is sufficient in constructing the unit. These multi-piece shields also are more economical to use than are the shields 17 since less metal is used in making them. In addition, the lugs 22 of the shields 17 are dispensed with since the panes rest upon the insulation 41. The flare 46 at the lower portions of the shield members aids in anchoring them so that the shields are as securely fixed in the concrete as are the shields 17 by reason of the engagement of the wings 19 and 20 and the depending lugs 22 with the concrete.

When the panes 16 are set in the shields formed by the shield members 42, 43, and 44 or 45, the entire surface of the apertured portion of the concrete not covered by the shields or the panes and their underlying insulation is covered with a waterproof and slightly elastic compound 47 which is filled in flush with the tops of the shield members and the upper surface of the panes. This compound 47 may also be a combination of tar and sulphur like the compounds 23, 25 and 35. The construction thus formed presents a planiform surface comprising the panes 16, the shield members 42, 43, and 44 or 45, and the compound 47, which completely covers the upper surface of the apertured portion of the concrete and protects it from the effects of the weather.

To protect the exposed surface of the border 36 one edge of a continuous metallic strip 48 is embedded in the concrete of the border 36 in engagement with the vertical inner wall 40 thereof, and also with the compound 47 around the edge of the apertured portion of the concrete. A firm anchorage for the strip 48 in the concrete may be effected by bending the embedded edge of the strip outwardly to form a wing 49. The upper portion of the strip 48 is bent outwardly in engagement with the top of the border 36 to form a flat surface 50 lying in the plane of the panes 16.

It will be noticed in Fig. 2 that the border 36 is provided along its top with a groove 51. The function of this groove is to form a border expansion joint, and to protect the concrete surfaces of this groove from the weather, the free edge of the strip surface 50 is tucked into the groove 51 in engagement with the surfaces thereof. The top surface of the border 36 beyond the groove 51, and also the side wall 52 of the border, are covered with a metallic sheet 53, one edge 54 of which is tucked into the groove 51 in engagement with the strip surface 50, and the other edge of which engages the side wall 52 of the border 36 and overlaps the flashing 26 associated with the curbing 14. A strip of wood 55 like the strip 32 (Fig. 1), or lead plugs, may be embedded in the side wall 52 to provide a surface to which the metallic sheet 53 may be tacked, as indicated at 56. The groove 51 is filled flush with a waterproof and slightly elastic compound 57, like the compound 47, to form an expansion joint, and the compound may be anchored with occasional lead plugs 51A.

This construction, whereby the sheet 53 overlaps the flashing 26, is used for skylight purposes. For a floorlight construction there would be no flashing 26 and the sheet 53 would extend only partially down the wall 52 of the border 36, in abutment with the rest of the flooring, or with a waterproof and slightly elastic compound serving as an expansion joint between the unit disclosed and the flooring.

Each run of the border 36 is constructed in a manner like that of the run illustrated, and each is provided with a stripping and sheathing like the strip 48 and the metallic sheet 53. With this construction the upper surface of the concrete of both the border 36 and the apertured portion formed by the grid members 37 is completely covered by the panes 16, the compound 47, the shields 42, 43, and 44 or 45, the strip surface 50, the compound 57 and the metallic sheet 53, and this covering is planiform, making it suitable for floorlight uses. Stated in another way, the entire external surface of the concrete unit is completely covered by materials which are waterproof and/or elastic and which fully protect the concrete from the effects of the weather.

Figure 7:
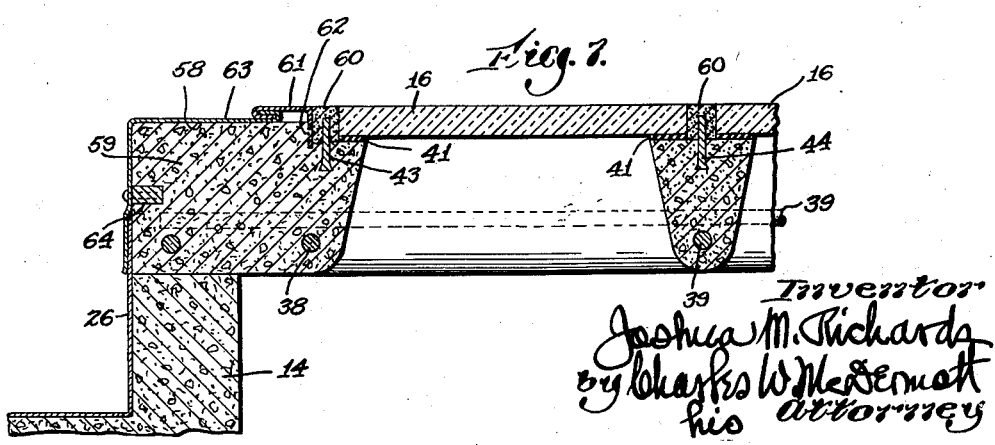
Fig. 7 is a detail view in sectional elevation showing a third form of the present invention.

A third construction is illustrated in Fig. 7, and is preferably used for skylight purposes. In this construction the concrete is formed exactly like that shown in Fig. 2 with the exception that the top surface 58 of the border 59 lies in a plane about midway between the top and bottom of the panes 16 when resting on the insulation 41.

The purpose of this construction is to provide for a complete coverage of the tops of the spaced shield members 42, 43, and 44 or 45 so that they will not be exposed and so that the upper surface of the shield area will appear to be merely rows of panes 16 between which a waterproof and slightly elastic compound is placed. To this end the shield members are embedded deeper in the concrete than shown in Fig. 2 so that their tops are lower than the upper surface of the panes 16. When the panes are in position within the shields, the space between is filled flush with the tops of the panes with a waterproof and slightly elastic compound 60 which may be like the compound 47, thereby providing a planiform surface which hides the shield members. The border 59 is partially covered by a continuous strip 61 like the strip 28 (Fig. 1) preferably provided with anchorage apertures 62 like the apertures 330 (Fig. 1). The free edge of the strip 61 is bent to form a channel which receives the correspondingly bent edge of a metallic sheet 63 like the sheet 30 (Fig. 1), and this sheet 63 covers the border 59, overlaps the flashing 26, and is tacked to a strip of wood 64 or to lead plugs embedded in the border 59 in a manner identical with the construction shown in Fig. 1. This construction, like that shown in Figs. 1 and 2, affords a complete coverage for the external surface of the concrete unit, and completely protects it from the weather.

It will be seen that in any or all of the constructions shown, if any cracks or fissures should develop in the concrete grid or in the border, the watertightness of the construction would not be affected since the superimposed waterproofing materials seal the top surface of the concrete. Stated in another way, the watertightness of the construction does not depend upon the concrete, because all the concrete surfaces that were exposed to the weather in older types of construction are by the present invention completely protected with a watertight covering.

Furthermore, although a satisfactory caulking of the cracks and fissures in the concrete of the older types of construction was difficult and often impossible because the concrete was exposed to the effects of the weather, by the present invention, should leakage occur for some unforseen reason, it is a simple matter to caulk the expansion joints between the shields or between the shields and the runs of the border. Also, should any of the sheathing joints open up, this defect can be readily seen and remedied. It will also be seen that the danger of separation of the panes from the concrete unit is minimized. The panes are held within the shields 17 (Fig. 1) by the compound 23, and the shields themselves, in addition to being anchored in the concrete, are further held in position by the compounds 25 and 35. In the case of the Figs. 2 and 7 constructions, the panes are held over the insulating material and within the shield members by the compounds 47 or 60, respectively, and do not depend upon the concrete alone for positioning and sealing. The dangers of cracking and of imperfect bonding between glass and concrete are removed so that the preparation of the units disclosed does not require the direction of workmen skilled in building the older types of construction.

Nothing herein explained is to be interpreted as limiting the various features of the present invention in the scope of its application to use in connection with the particular skylight or floorlight or the particular mode of construction or both selected for the purpose of illustration and explanation. For example, the methods of sheathing the concrete border indicated in Figs. 1, 2 and 7 are shown only for purposes of disclosure. Other methods of sheathing may be used without affecting the scope of the present invention. It will also be apparent that by modifying the borders 10, 36, and 59, respectively, any of the sheathing constructions shown may be used in connection with any of the shield and pane constructions shown. While the particulars of construction herein set forth are well suited to one form of the present invention and to the use to which it is put, it is not limited to this use, nor to these details of construction, nor to the conjoint use of all its features, nor is it to be understood that these particulars are essential, since they may be modified within the skill of the artisan without departing from the true scope of the actual invention, characterizing features of which are set forth in the following claims by the intentional use of generic terms and expressions inclusive of various modifications.

What is claimed as new, is:

1. In a skylight or floorlight construction, the combination with a reinforced concrete framework comprising a solid portion and a portion provided with at least one opening, a light transmitting pane for the opening, and a pane-receiving shield anchored in the concrete about the opening spaced from the solid portion so as to leave the concrete adjacent thereto exposed, of means adapted to engage the pane and the shield for covering the exposed concrete.

2. In a skylight or floorlight construction, the combination with a reinforced concrete framework comprising a solid portion and a portion provided with at least one opening, a light transmitting pane for the opening, and a pane-receiving shield anchored in the concrete about the opening spaced from the solid portion so as to leave the concrete adjacent thereto exposed, of a waterproof and elastic compound adapted to engage the pane and the shield for covering the exposed concrete.

3. In a skylight or floorlight construction, the combination with a reinforced concrete framework comprising a solid portion and a portion provided with at least one opening, a light transmitting pane for the opening and a pane-receiving shield anchored in the concrete about the opening spaced from the solid portion so as to leave the concrete adjacent thereto exposed, of a waterproof and elastic compound adapted to engage the pane and the shield for covering the exposed concrete, the entire construction being such that at least the pane and the compound lie in a plane above the portion of the concrete provided with the opening.

4. In a skylight or floorlight construction, the combination with a reinforced concrete framework provided with a plurality of openings, light transmitting panes for the openings, pane-receiving shields spaced from each other and secured to the concrete about the openings so that the tops of the shields are on a level higher than that of the concrete, and a binder for retaining the panes in the shields, of means engaged with the spaced shields flush with their tops for covering the concrete exposed adjacent thereto.

5. In a skylight or floorlight construction, the combination with a plurality of light transmitting panes, shields, therefor, and a waterproof and elastic binder for the panes and shields, all set in reinforced concrete to form a unit in which the tops of the panes, shields, and binder lie in a plane above the concrete and in which the shields are spaced from each other, of means, terminating in said plane, for covering the concrete exposed by the spaced shields.

6. In a sklight or floorlight construction, the combination with a plurality of light transmitting panes, shields therefor, and a waterproof and elastic compound forming a binder for the panes and shields, all set in reinforced concrete to form a unit in which the shields are spaced from each other with their tops in a plane above the concrete, of a waterproof and elastic compound terminating flush with the tops of the shields for covering the concrete exposed adjacent the spaced shields, and a sheathing secured to the concrete and engaged with said compound for covering the concrete exposed outside the shield area.

7. A skylight or floorlight construction comprising, in combination, a reinforced concrete framework consisting of a peripheral border and a portion within provided with a plurality of openings, light transmitting panes for the openings, means for securing the panes in position with respect to the openings, and a sheathing for covering the border, said pane securing means comprising shield members, anchored in the concrete spaced from each other and positioned about only the corners of the panes, and a waterproof and elastic compound positioned around the panes and engaging the shield members and the sheathing.

8. A skylight or floorlight construction comprising, in combination, a reinforced concrete framework consisting of a peripheral border and a portion within provided with a plurality of openings, light transmitting panes for the openings, means for securing the panes in position with respect to the openings, and a sheathing for covering the border, said pane securing means comprising shield members, anchored in the concrete with their tops below the upper surface of the panes, spaced from each other and positioned about only the corners of the panes, and a waterproof and elastic compound positioned around the panes in engagement with the sheathing and the shield members and covering the tops of the latter.

9. In a skylight or floorlight construction, the combination with a reinforced concrete framework provided with a plurality of openings, light transmitting panes for the openings, and pane-receiving shields, adapted to support the panes with the upper surfaces thereof flush with the tops of the shields, anchored in the concrete spaced from each other with their tops in a plane above the concrete, of means terminating flush with the upper surfaces of the panes for securing the panes in the shields and means terminating flush with the tops of the shields for covering the concrete exposed adjacent the shields.

10. A skylight or floorlight construction comprising, in combination, a reinforced concrete framework provided with a plurality of openings, light transmitting panes for the openings, pane-receiving shields, the sides of which comprise a web and spaced inner and outer wings depending therefrom, anchored in the concrete with the outer wings of adjacent shields spaced from each other, a waterproof and elastic compound forming a binder for the panes and the inner wings of the shields, and a waterproof and elastic compound extending between said spaced outer wings flush with the webs thereof for covering the concrete exposed adjacent said outer wings.

11. In a skylight or floorlight construction, the combination with a reinforced concrete framework comprising a peripheral border and a portion within, on a level lower than the border, provided with a plurality of openings, light transmitting panes for the openings, and a sheathing for covering the border, of means for securing the panes in position with respect to the openings, said means comprising shield members anchored in the concrete spaced from each other and positioned about only the corners of the panes, and a waterproofed and elastic compound positioned around the panes and engaging the shield members and the sheathing, the difference in height between the border and the portion provided with the openings being such that at least the panes and the compound form a planiform surface lying in the plane of the sheathing.

12. In a skylight or floorlight construction, the combination with a reinforced concrete framework comprising a peripheral border and a portion within provided with at least one opening, a light transmitting pane for the opening, and a pane-receiving shield anchored in the concrete about the opening spaced from the border so as to leave the adjacent concrete exposed, of means engaged with at least the shield for covering the concrete exposed within the border.

13. In a skylight or floorlight construction, the combination with a reinforced concrete framework comprising a peripheral border and a portion within provided with at least one opening, a light transmitting pane for the opening, a pane-receiving shield anchored in the concrete about the opening spaced from the border so as to leave the adjacent concrete exposed, and means engaged with at least the shield for covering the concrete exposed within the border, of a sheathing, engaged with said means, for covering the border.

14. In a skylight or floorlight construction, the combination with a reinforced concrete framework comprising a peripheral border and a portion within provided with at least one opening, a light transmitting pane for the opening, and a pane-receiving shield anchored in the concrete about the opening spaced from the border so as to leave the adjacent concrete exposed, of means terminating in the plane of the pane for covering the exposed concrete.

15. In a skylight or floorlight construction, the combination with a reinforced concrete framework comprising a peripheral border and a portion within provided with at least one opening, a light transmitting pane for the opening, a pane-receiving shield anchored in the concrete about the opening spaced from the border so as to leave the adjacent concrete exposed, and means terminating in the plane of the pane for covering the exposed concrete, of a sheathing, engaged with said means, for covering the border.

16. In a skylight or floorlight construction, the combination with a reinforced concrete framework comprising a peripheral border and a portion within provided with a plurality of openings, light transmitting panes for the openings, and pane-receiving shields spaced from each other and from the border and secured to the concrete about the openings, of means engaged with at least the shields for covering the concrete exposed within the border.

17. In a skylight or floorlight construction, the combination with a reinforced concrete framework comprising a peripheral border and a portion within provided with a plurality of openings, light transmitting panes for the openings, pane-receiving shields spaced from each other and from the border and secured to the concrete about the openings, and means engaged with at least the shields for covering the concrete exposed within the border, of a sheathing, engaged with said means, for covering the border.

18. In a skylight or floorlight construction, the combination with a reinforced concrete framework comprising a peripheral border and a portion within provided with at least one opening, a light transmitting pane for the opening, and a shield for the pane anchored in the concrete about the opening spaced from the border so as to leave concrete lying between the shield and the border exposed, of means for covering said exposed concrete.

19. In a skylight or floorlight construction, the combination with a reinforced concrete framework comprising a peripheral border and a portion within provided with a plurality of openings, light transmitting panes for the openings, and shields for the panes anchored in the concrete spaced from the border, of means for covering concrete exposed between the shields and the border.

20. In a skylight or floorlight construction, the combination with a reinforced concrete framework comprising a peripheral border provided with an inner wall and a portion within said border provided with at least one aperture, the periphery of said apertured portion comprising an inwardly extending shoulder located adjacent the base of said wall, a light transmitting pane for the aperture, and a shield for the pane anchored in the shoulder concrete spaced from said wall, of means for covering shoulder concrete exposed between the shield and the wall.

21. In a skylight or floorlight construction, the combination with a reinforced concrete framework comprising a peripheral border provided with an inner wall and a portion within said border provided with at least one aperture, the periphery of said apertured portion comprising an inwardly extending shoulder located adjacent the base of said wall, a light transmitting pane for the aperture, and a shield for the pane anchored in the shoulder concrete spaced from said wall, of a waterproof and elastic compound for covering shoulder concrete exposed between the shield and the wall.

22. In a skylight or floorlight construction, the combination with a reinforced concrete framework comprising a peripheral border provided with an inner wall and a portion within said border provided with a plurality of apertures, the periphery of said apertured portion comprising an inwardly extending shoulder located adjacent the base of said wall, light transmitting panes for the apertures, and shields for the panes anchored in the concrete of the apertured portion including said shoulder, said shields being spaced from said wall to leave shoulder concrete adjacent said wall exposed, of means for covering said exposed shoulder concrete.

23. In a skylight or floorlight construction, the combination with a reinforced concrete framework comprising a peripheral border provided with an inner wall and a portion within said border provided with a plurality of apertures, the periphery of said apertured portion comprising an inwardly extending shoulder located adjacent the base of said wall, light transmitting panes for the apertures, and shields for the panes anchored in the concrete of the apertured portion including said shoulder, said shields being spaced from said wall to leave shoulder concrete adjacent said wall exposed, of a waterproof and elastic compound for covering said exposed shoulder concrete.

24. A skylight or floorlight construction comprising, in combination, a reinforced concrete framework consisting of a peripheral border and a portion within provided with a plurality of openings, light transmitting panes for the openings, and means for securing the panes in position with respect to the openings, said means comprising shield members anchored in the concrete and provided with arms each lying partially directly adjacent and partially indirectly adjacent a side of a pane, the shield members being so positioned with respect to the panes that at least one arm of each shield member is directly adjacent a given pane side for less than half the length of said side, and a waterproof and elastic compound surrounding the sides of the panes and engaged with the shield members.

25. A skylight or floorlight construction comprising, in combination, a reinforced concrete framework consisting of a peripheral border and a portion within provided with a plurality of openings, light transmitting panes for the openings, and means for securing the panes in position with respect to the openings, said means comprising shield members anchored in the concrete and provided with arms each lying partially directly adjacent and partially indirectly adjacent a side of a pane, the length of at least one arm of each shield member, as compared to the length of the adjacent pane side, being such that said arm is directly adjacent said pane side for less than half the length of said side, and a waterproof and elastic compound surrounding the sides of the panes and engaged with the shield members.

26. A skylight or floorlight construction comprising, in combination, a reinforced concrete framework consisting of a peripheral border and a portion within provided with a plurality of openings, light transmitting panes for the openings, and means for securing the panes in position with respect to the openings, said means comprising shield members anchored in the concrete and consisting of at least one arm lying adjacent a side of a pane, the length of said arm being less than the length of the pane side to which the arm is adjacent, and a waterproof and elastic compound surrounding the sides of the panes and engaged with the shield members.

27. A skylight or floorlight construction comprising, in combination, a reinforced concrete framework consisting of a peripheral border and a portion within provided with a plurality of openings, light transmitting panes for the openings, and means for securing the panes in position with respect to the openings, said means comprising shield members anchored in the concrete and provided with arms each lying adjacent a side of a pane, the length of each arm being less than the length of the pane side to which the arm is adjacent, and a waterproof and elastic compound surrounding the sides of the panes and engaged with the shield members.

28. A skylight or floorlight construction comprising, in combination, a reinforced concrete framework consisting of a peripheral border and a portion within provided with a plurality of openings, light transmitting panes for the openings, and means for securing the panes in position with respect to the openings, said means comprising shield members anchored in the concrete about the openings and provided with arms the opposite sides of which form walls, there being a plurality of said shield members about each opening, the adjacent arms, respectively, of any two successive shield members about each opening each lying adjacent a given side of the pane for said opening and the adjacent ends of said adjacent arms being spaced apart to leave a gap therebetween, and a waterproof and elastic compound surrounding the sides of the panes and engaged with the arm walls lying adjacent the panes, said compound also extending around the spaced ends of said arms to fill said gaps.

29. A skylight or floorlight construction comprising, in combination, a reinforced concrete framework comprising a peripheral border and a portion within provided with a plurality of openings, light transmitting panes for the openings, a sheathing for covering at least a portion of the border, and means for securing the panes in position with respect to the openings, said means comprising shield members anchored in the concrete about the openings spaced from the border and provided with arms the opposite sides of which form walls, there being a plurality of said shield members about each opening, the adjacent arms, respectively, of any two successive shield members about each opening each lying adjacent a given side of the pane for said opening and the adjacent ends of said adjacent arms being spaced apart to leave a gap therebetween, and a waterproof and elastic compound surrounding the sides of the panes and engaged with the arm walls lying adjacent the panes, said compound also extending around the spaced ends of said arms to fill said gaps and, in the case of arms lying adjacent the peripheral border, extending from the gaps between said arms into engagement with the sheathing and the adjacent arm walls to fill the space therebetween.

JOSHUA M. RICHARDS.